(12) United States Patent
Gilsing (10) Patent No.: US 10,889,454 B2
(45) Date of Patent: Jan. 12, 2021

(54) DIVERTER ASSEMBLY FOR A PNEUMATIC TRANSPORT SYSTEM

(71) Applicant: FrieslandCampina Nederland B.V., Amersfoort (NL)

(72) Inventor: Frans Gilsing, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 0 days.

(21) Appl. No.: 16/311,698

(22) PCT Filed: Jun. 27, 2017

(86) PCT No.: PCT/NL2017/050428
§ 371 (c)(1),
(2) Date: Dec. 20, 2018

(87) PCT Pub. No.: WO2018/009056
PCT Pub. Date: Jan. 11, 2018

(65) Prior Publication Data
US 2019/0291976 A1    Sep. 26, 2019

(30) Foreign Application Priority Data
Jul. 4, 2016    (EP) ..................................... 16177802

(51) Int. Cl.
*B65G 53/58*    (2006.01)
*B65G 53/52*    (2006.01)

(52) U.S. Cl.
CPC .......... *B65G 53/528* (2013.01); *B65G 53/521* (2013.01)

(58) Field of Classification Search
CPC .. B65G 53/58; B65G 53/528; B65G 2205/00; B65G 2205/02; B65G 2205/04; B65G 2205/06
USPC ......... 406/157, 158, 159, 160, 161, 83, 181, 406/183; 111/176; 198/442; 110/310; 222/408; 137/561 A, 875
See application file for complete search history.

(56) References Cited

U.S. PATENT DOCUMENTS

| | | |
|---|---|---|
| 3,117,821 A | 1/1964 | Insu |
| 3,204,942 A | 9/1965 | Babcock |
| 3,722,544 A | 3/1973 | Westenberg |
| 4,436,459 A | 3/1984 | Caldwell |

(Continued)

FOREIGN PATENT DOCUMENTS

| | | |
|---|---|---|
| DE | 4405943 A1 | 8/1995 |
| EP | 0111589 A1 | 6/1984 |

(Continued)

*Primary Examiner* — Joseph A Dillon, Jr.
(74) *Attorney, Agent, or Firm* — N.V. Nederlandsch Octrooibureau; Catherine A. Shultz; Katelyn J. Bernier (57) ABSTRACT

Diverter assembly for pneumatic transport of a substance using a fluid flow, e.g. for transporting whey powder. A diverter main body is provided with an input pipe connection having an input flow direction, and at least one output pipe connection having an output flow direction perpendicular to the input flow direction. The diverter main body further comprises a collision wall part arranged remote and opposite from the input pipe connection and having a collision surface arranged perpendicular to the input flow direction, and a narrowing flow part shaped and arranged to provide a flow path from the collision wall part to the at least one output pipe connection.

16 Claims, 4 Drawing Sheets

(56) References Cited

U.S. PATENT DOCUMENTS

| | | | | |
|---|---|---|---|---|
| 4,462,140 A * | 7/1984 | Wood | | D01G 23/02 19/105 |
| 4,536,104 A | 8/1985 | Bungert | | |
| 6,068,429 A * | 5/2000 | Schultheis | | B65G 53/60 406/157 |
| 6,089,378 A * | 7/2000 | Mascheretti | | D01G 31/003 209/134 |
| 6,634,833 B2 * | 10/2003 | Gillespie | | B65G 53/58 406/168 |
| 6,921,037 B2 * | 7/2005 | Wysong | | B65G 69/0491 239/665 |
| 7,318,459 B2 * | 1/2008 | Frankeberger | | B65G 51/02 141/67 |
| 7,854,205 B2 * | 12/2010 | Beaujot | | A01C 7/081 111/176 |
| 8,051,877 B2 | 11/2011 | Lichney | | |
| 8,322,951 B2 * | 12/2012 | Kvalheim | | B65G 65/36 406/109 |
| 8,505,574 B2 * | 8/2013 | Petersen | | A01C 7/084 137/561 A |
| 8,784,013 B2 * | 7/2014 | Watson | | B65G 53/56 137/561 A |
| 8,876,439 B2 * | 11/2014 | Sheehan | | B01J 8/0015 198/534 |
| 2010/0107945 A1 * | 5/2010 | Beaujot | | A01C 7/081 111/176 |
| 2010/0232889 A1 * | 9/2010 | Sheehan | | B01J 8/0015 406/168 |
| 2015/0098767 A1 * | 4/2015 | Beaujot | | A01C 7/084 406/181 |
| 2016/0176657 A1 * | 6/2016 | Kramer | | B65G 53/56 406/183 |
| 2016/0205866 A1 * | 7/2016 | Funck | | A01C 7/081 |
| 2017/0142896 A1 * | 5/2017 | Roberge | | B65G 53/528 |

FOREIGN PATENT DOCUMENTS

| | | |
|---|---|---|
| EP | 1026107 A1 | 8/2000 |
| GB | 300126 A | 2/1929 |
| GB | 886331 A | 1/1962 |
| GB | 2254899 A | 10/1992 |
| NL | 1018098 C2 | 11/2002 |
| WO | 1999049719 A1 | 10/1999 |

\* cited by examiner

DIVERTER ASSEMBLY FOR A PNEUMATIC TRANSPORT SYSTEM

FIELD OF THE INVENTION

The present invention relates to a diverter assembly for pneumatic transport of a substance, such as particle-laden or powder like substances.

PRIOR ART

American patent publication U.S. Pat. No. 4,536,104 discloses a pipe divider for pipes conveying solids. A cylindrical distributor chamber is provided to which a feed pipe is connected to provide solids in an air flow tangentially to the cylindrical distributor chamber. Two outlet pipes (with individually operated shut-off valves) are connected centrally and at right angles from the two end faces of the cylindrical distributor chamber.

European patent publication EP-A-1 026 107 discloses a joint for pipelines for pneumatic transportation of loose materials. The joint has an inlet and outlet mouth arranged at an angle of 90° to each other. A spherical cap-type concavity is provided with its center arranged in proximity of an axis of the inlet mouth, and a rounded swell is provided between the concavity and the outlet mouth. As a result, material transported follows the curvature of the concavity and the swell, and is not accumulating in the 90° bend.

SUMMARY OF THE INVENTION

Pneumatic transport or conveyance is an efficient and frequently used method for transporting powder and particle-laden materials or product streams in the process industry. Pneumatic transport has many advantages compared to mechanical transport.

For example, pneumatic transportation systems typically require less complex mechanical designs and as a result often exhibit less mechanical malfunction and provide increased service life and durability. However, collision, attrition and/or friction may occur between e.g. particle-laden product streams and walls of transport pipes of conventional pneumatic transport systems, especially at bends and arcuate portions of the transport pipes. Furthermore, during pneumatic conveyance product streams such as powders streams may degrade and break apart. In addition, for certain powder streams comprising crystal water, such as lactose monohydrate powder, severe caking or scaling may occur in bends and arcuate portions of the transport pips.

Scaling phenomenon in pneumatic transportation systems is highly undesirable for a number of reasons. First, with continuing scaling at bends and arcuate portions of pipe work the more clogged a pipe bend becomes. To solve this problem the transportation system has to be opened, rinsed and cleaned, leading to costly interruptions of production processes. Furthermore, cleaning pipe work often results in exposing the interior of the transport system to a non-sterile environment, thereby breaching sterility of the transportation system. Another problem that may occur is that chunks and pieces from powder scales may occasionally dislodge from a pipe bend wall and potentially block further downstream pipes and/or valves and may also end up in the final product.

In view of the above and in light of new and more stringent safety requirements being introduced for food production, there is a need for a reliable, robust, and hygienic operation of a transportation system requiring very little or no interior cleaning at all.

The present invention seeks to provide an improved diverter assembly for a pneumatic transportation system which allows for transport of bulk materials, powders, particle-laden product streams and the like in an efficient, cost-effective and reliable manner, wherein known problems relating to caking, scaling and internal fouling of arcuate pipe sections and pipe bends of the pneumatic transportation system are prevented.

According to the present invention, a diverter assembly of the type defined in the preamble is provided, comprising a diverter main body provided with an input pipe connection having an input flow direction, and at least one output pipe connection having an output flow direction perpendicular to the input flow direction, wherein the diverter main body further comprises a collision wall part arranged remote and opposite from the input pipe connection and having a collision surface arranged perpendicular to the input flow direction, and a narrowing flow part shaped and arranged to provide a flow path from the collision wall part to the at least one output pipe connection. This allows a cost-effective solution to provide a building block for a pneumatic transport system which will effectively prevent caking and other undesired fouling of the inside of the transport system. This will prevent undesired and costly maintenance.

In a further aspect, the present invention relates to a method of providing a pneumatic transport system comprising connecting at least one diverter assembly according to any one of the present invention embodiments to an upstream pipe using the input pipe connection, and to at least one downstream pipe using the at least one output pipe connection. The at least one downstream pipe is positioned in a plane substantially perpendicular or orthogonal to a longitudinal direction of the upstream pipe. This allows to provide in a very flexible manner a pneumatic transport system which has no bent sections of piping, as all direction changes are possible using the diverter assembly. Furthermore as such diverter assemblies are used, the transport system can operate much longer than prior art systems without the need to open clean the inside of the pneumatic transport system piping.

SHORT DESCRIPTION OF DRAWINGS

The present invention will be discussed in more detail below, using a number of exemplary embodiments, with reference to the attached drawings, in which.

DETAILED DESCRIPTION OF EXEMPLARY EMBODIMENTS

The present invention pertains to a pneumatic transportation system for the transport of various materials, especially bulk material, such as powder like substances and particle-laden product streams, e.g. powdered lactose, wherein the pneumatic transportation system provides improved reliability whilst requiring considerably less servicing and maintenance.

In prior art installations it is found that bends and/or actuate portions in a pipe may be prone to undesired build-up of the material. Sometimes, the characteristics of the transported material itself makes the pipe network of the transportation system prone to scaling, caking or even blocking. For instance, crystalline materials that contain crystal water (hydrates) may release water upon energy input through e.g. shear stresses and as a result increased temperature. Lactose monohydrate, for example, is sensitive to scaling in a pneumatic transportation system. It is believed that bends or arcuate sections in a pipe induce fast recrystallization when hydrates collide with a pipe wall at those bends, causing the material to aggregate and form "plaque".

Examples of substances that may cause scaling and caking as described above are sugars such as glucose and lactose and salts such as sodium acetate, sodium bicarbonate/carbonate, but also whey protein concentrates up to 35% protein on dry weight (containing still significant amounts of lactose), whey powder, demineralized whey powder, delactosed whey and permeate for example.

In light of production efficiency and reliability but also from a cost perspective the problem of scaling and caking of pipes in a pneumatic transportation system should be prevented as this requires rigorous cleaning of affected pipes, which is cumbersome and may lead to bacterial contamination and growth. For example, pipe sections where build-up of material occurs have to be mechanically cleared (through e.g. hammering) or even disconnected to allow flushing, cleaning and drying of clogged pipe sections.

The present invention embodiments in one aspect relate to a diverter assembly for pneumatic transport of a substance using a fluid flow or generally a product stream, such as bulk material streams, powder streams, particle-laden streams and the like. In a particular example such substance or product stream may be lactose in an air flow.

Figure 1:
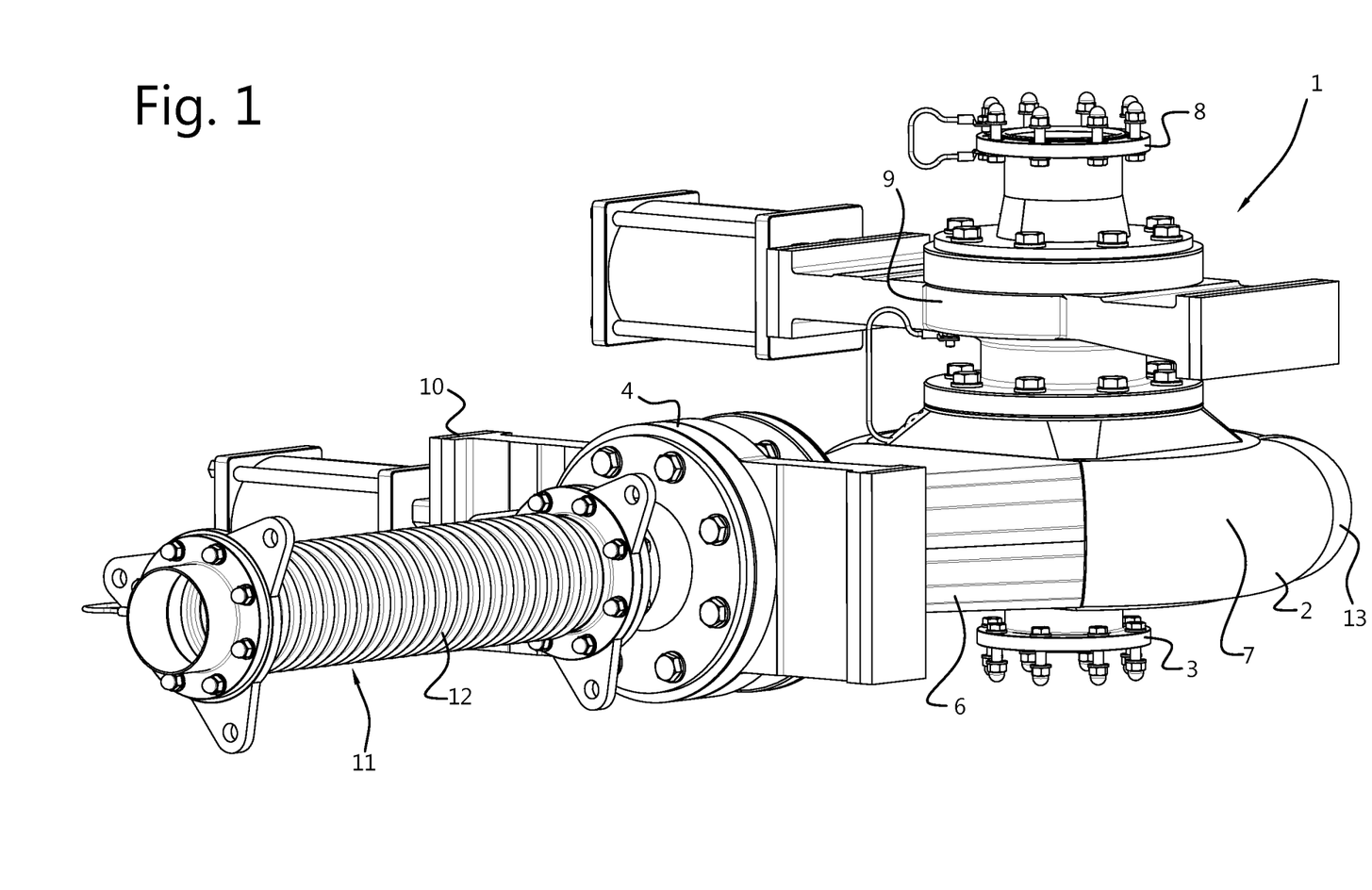
FIG. 1 shows a three dimensional view of an embodiment of a diverter assembly according to the present invention.
Figure 2:
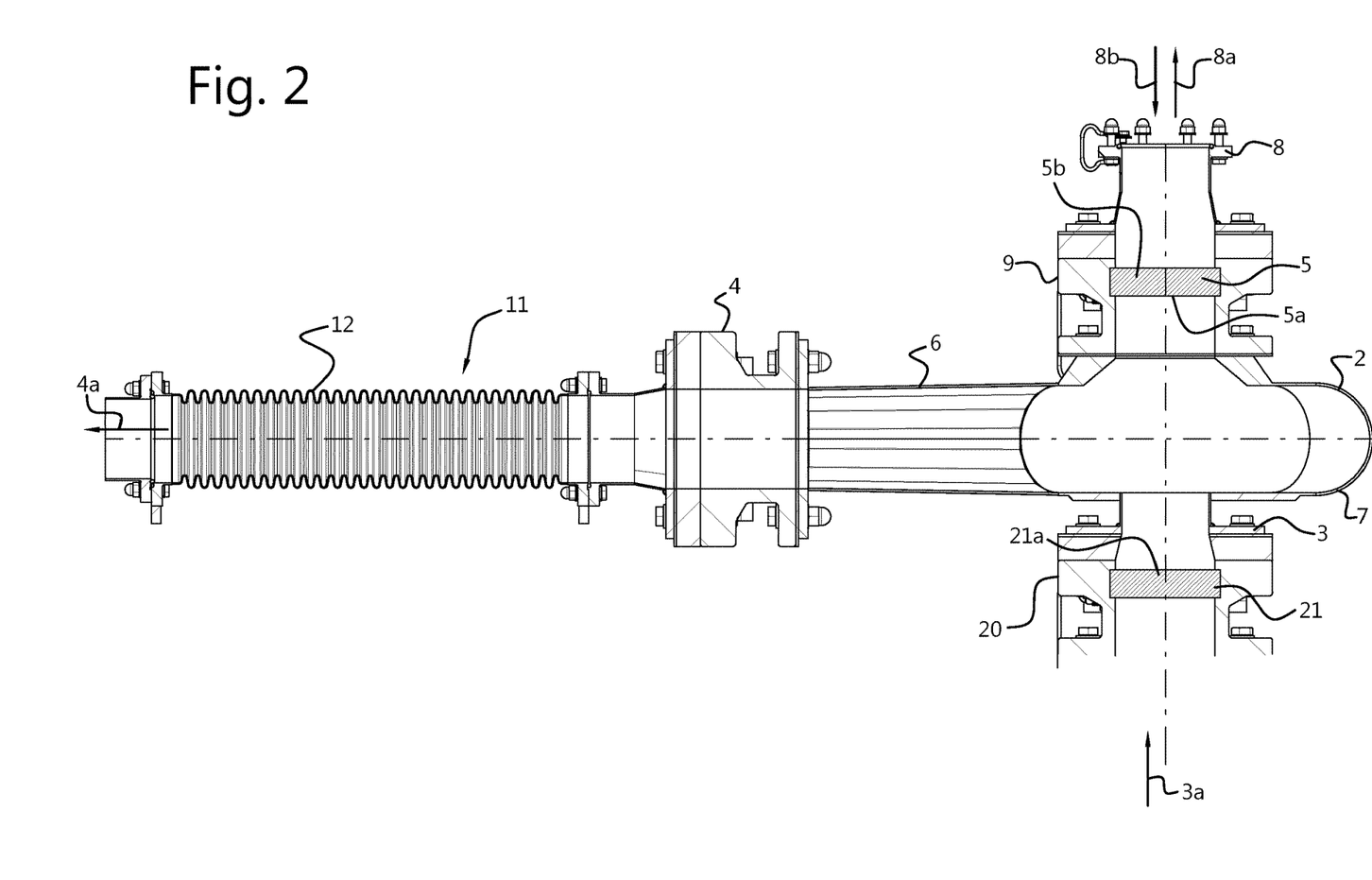
FIG. 2 shows a cross sectional view of an embodiment of a diverter assembly according to the present invention.
Figure 3:
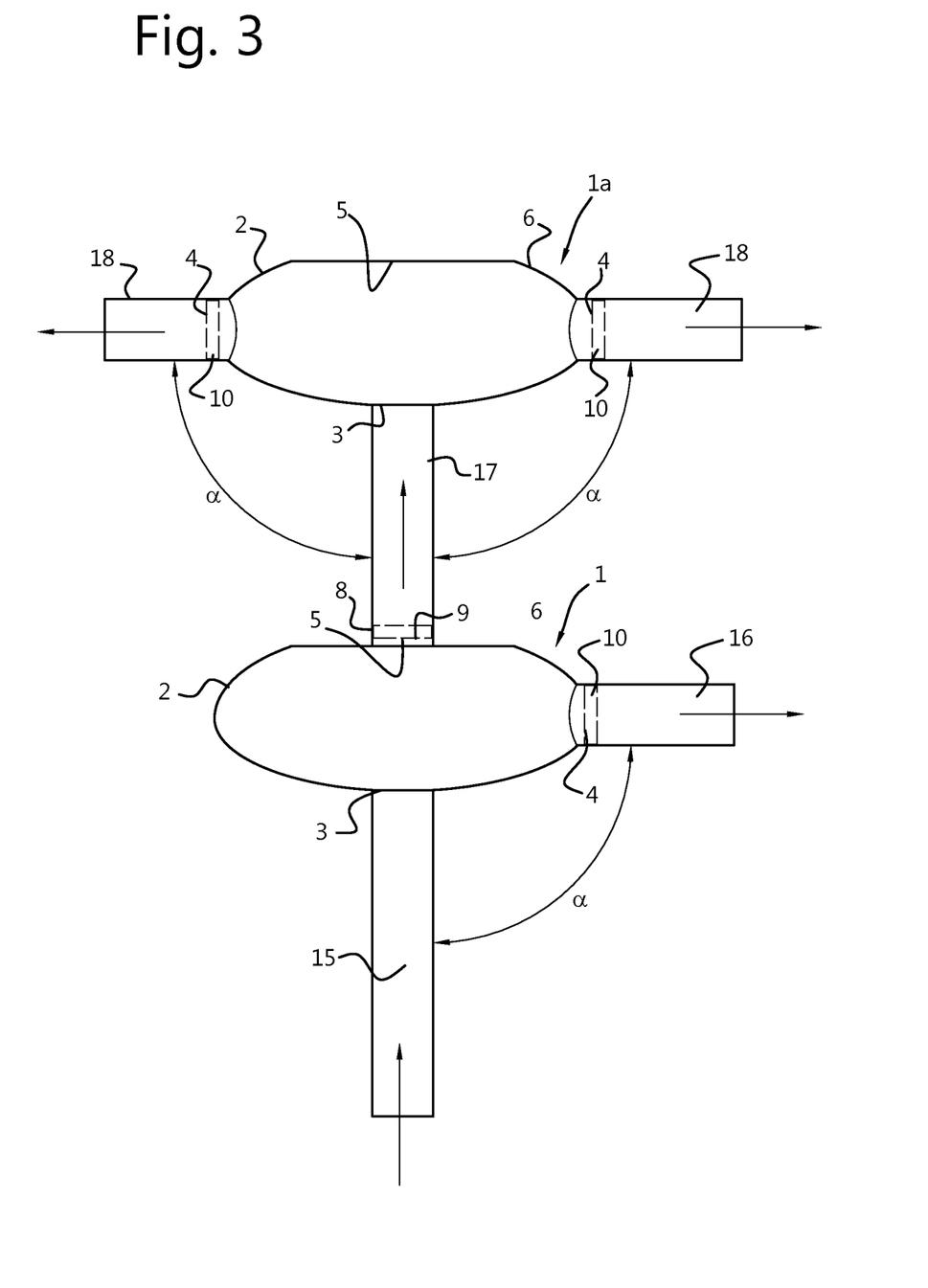
FIG. 3 shows a schematic view of a part of a pneumatic transport system according to an embodiment of the present invention.

FIG. 1 shows a three dimensional view of an embodiment of a diverter assembly according to the present invention, and FIG. 2 shows a cross sectional view of an embodiment of a diverter assembly. FIG. 3 shows a cross sectional schematic view of a combination of two embodiments of diverter assemblies 1, 1a.

In the embodiments shown, the diverter assembly 1 comprises a diverter main body or casing 2 provided with an input pipe connection 3 having an input flow direction 3a, and at least one output pipe connection 4 having an output flow direction 4a perpendicular, i.e. substantially at 90°, to the input flow direction 3a. Therefore, the input flow direction 3a and output flow direction 4a may be considered as being orthogonal. The diverter main body 2 further comprises a collision wall part 5 remote and opposite from the input pipe connection 3 and is provided with a collision surface 5a (substantially) perpendicular to the input flow direction 3a (see also the upper diverter assembly 1a as shown in FIG. 3). The diverter main body 2 further comprises a narrowing flow part 6 which is shaped and arranged to provide a flow path from the collision wall part 5 to the at least one output pipe connection 4. The narrowing flow part 6 is e.g. implemented as a funnel shaped body or a tapered channel part.

The collision wall part 5 effectively blocks the direction of travel of the material in the fluid flow or product stream as it enters the diverter assembly 1, where the fluid flow with the material travels toward the only exit possible, i.e. toward the output pipe connection 4. The diverting action or deflection imposed by the diverter assembly 1 is primarily achieved through diverting action or deflection by the transported substance itself and not so much from the deflection by material of the diverter main body 2 on the fluid flow as is known from prior art systems using e.g. flat tube bends. As a result, friction imposed on the product stream in the diverter assembly 1 is almost entirely caused by the product stream itself, i.e. 'product-on-product' deflection. For example, in case the pneumatic transportation system conveys a powder or particle-laden product stream, the diverting action and deflection of the diverter assembly 1 is primarily causes by the powder or particles themselves, which prevents the unwanted caking and scaling as mentioned earlier. In particular, a small layer of the transported substance in contact with the collision wall part 5 provides the "product-on-product" deflection, but due to abrasive action of the substance or particle-laden product stream this layer is continuously renewed and replenished. As such scaling and caking does not occur in the diverter assembly 1.

In a further embodiment, the diverter main body or casing 2 may comprises a curved wall part 7 extending between the collision wall part 5 to the input pipe connection 3, wherein the curved wall part 7, narrowing flow part 6 and collision wall part 5 form a fluid tight enclosure between the input pipe connection 3 and the at least one output pipe connection 4. The curved wall part 7 slows down the substance flow and the narrowing flow part 6 allows a smooth convergence and guidance of diverted substance toward the output pipe connection 4 with minimal turbulence.

In an embodiment, the curved wall part 7 may have e.g. a donut like shape, providing a smooth curvature radially extending from the input pipe connection 3. In another embodiment, the collision wall part 5 has a surface area larger than a cross sectional surface area of the input pipe connection 3. This embodiment allows the substance to enter and impact the diverter main body 2 perpendicular to the output flow direction 4a, thus facilitating product-on-product diverting action and deflection.

The at least one output pipe connection 4 may further comprise two, three or four output pipe connections. In this embodiment the output pipe connections 4 may be distributed along a circumference of the diverter main body 2, e.g. distributed at specific pre-determined angles, according to specifications. In an exemplary embodiment, the two, three or four output pipe connections may each have a corresponding output flow direction (substantially) perpendicular to the input flow direction 3a. E.g. in the embodiment shown in FIG. 3, the upper diverter assembly 1a has two output pipe connections 4 at 180° to each other.

In a further advantageous embodiment, the diverter assembly 1 further comprises an additional pipe connection 8 with an additional input or output flow direction 8a, 8b substantially aligned with the input flow direction 3a, see e.g. FIG. 2. The additional pipe connection 8 then comprises a valve assembly 9, wherein the valve assembly 9 is arranged to function as the collision wall part 5 of the diverter main body 2 in a closed position. This embodiment allows the diverter assembly 1 to act as a two-way valve for bulk material, powders and various particle-laden product streams, with the advantage that caking is avoided at the "bend", i.e. the point of diversion or deflection of the product stream in the diverter assembly 1. In a particular embodiment, the valve assembly 9 comprises a retractable member 5b comprising the collision wall part 5.

In case the valve assembly 9 is in the open position, the diverter assembly 1 may be envisaged as providing a bypass, thereby letting a transported substance to pass the diverter assembly 1 without being deflected. In an embodiment, the additional pipe connection 8 may be arranged opposite and aligned with the input pipe connection 3, hence providing a straight passageway through the diverter assembly 1 when the valve assembly 9 is in an open position.

The valve assembly 9 effectively turns the diverter assembly 1 into a two-way valve whereby a pipe network can be arranged comprising a plurality of diverter assemblies 1 capable of diverting a transported substance to a plurality of branched locations in the pipe network yet avoid any scaling, caking and/or internal fouling of the pipe network. The various diverter assemblies 1 may be arranged in a tree-like structure of pipes, wherein output pipes are connected at e.g. different height levels above a main input connection.

In a further embodiment, the at least one output pipe connection 4 is provided with a further valve assembly 10, allowing to select which output connection 4 of multiple output connections is to be used. Also, the output pipe connection 4 may be in a closed position in conjunction with an open position of the additional pipe connection 8. The diverter assembly 1 may be arranged to select one output connection 4 to which material is to be directed, but, alternatively, a plurality of output connections may be opened simultaneously when the additional pipe connection 8 is closed, for example.

The valve assembly 9 and/or the further valve assembly 10 may each be a sliding type of valve assembly, e.g. a guillotine or gate type of shut-off valve. Such type of valve can accomplish a very good sealing of output connections and prevent any of the transported material to enter a pipe connected to the output pipe connection 4 or additional pipe connection 8 when closed. Especially when the material to be transported is a very fine powdered material, such a type of valve may be particularly advantageous.

Alternatively or additionally, the valve assembly 9 and one or more of the further valve assemblies 10 may comprise a butterfly type of valve. As a further implementation of a butterfly type of valve, it is conceivable that a butterfly type of valve comprises an inflatable seal for the valve or an inflatable valve seat. Such inflatable sealing functionality will further help in effective sealing operation of the valve assembly 9 and one or more further valve assemblies 10, wherein any kind of abrasive action or carving is prevented by the substance (e.g. lactose powder) when it would pass the seal or valve seating.

With further reference to FIG. 2, in an embodiment the input pipe connection 3 may further comprise an input valve assembly 20, which may be used to close off material flow in the input pipe connection 3. In an even further embodiment the input valve assembly 20 comprises a further collision wall part 21 of the diverter main body 2. The further collision wall part 21 acts as a further collision surface 21a when the input valve assembly 20 is in a closed position (and the oppositely positioned valve assembly 9 in additional pipe connection 8 is in an open position). This embodiment is advantageous when the additional pipe connection 8 acts as a flow input to the diverter assembly 1, i.e. wherein the additional pipe connection 8 has an additional input flow direction 8b when the valve assembly 9 is in an open position.

Like the collision wall part 5, the further collision wall part 21 of the further valve assembly 20 is arranged remote and opposite from the additional pipe connection 8 and is provided with a further collision surface 21a arranged perpendicular to the additional input flow direction 8b. The further collision wall part 21 allows diversion or deflection of bulk material, powder and particle-laden streams entering the diverter assembly 1 from the additional pipe connection 8 toward the at least one output pipe connection 4 when the valve assembly 9 is open.

From the above embodiment it is clear that the diverter assembly 1 may receive a substance from either the input pipe connection 3 or the additional pipe connection 8, depending on whether the valve assembly 9 and the input valve assembly 20 are in an open and closed position, respectively, or vice versa.

As with the valve assembly 9, the input valve assembly 20 may be provided with a retractable member comprising the further collision wall part 21. In an embodiment and just like the valve assembly 9 of the additional pipe connection 8, the input valve assembly 20 may be a sliding type, gate type or a butterfly type of valve assembly.

In order to further prevent any possible caking of product in a downstream pipe connected to an output pipe connection 4, the diverter assembly 1 may further comprise an output pipe part 11 provided at least partly with a turbulence enhancing inner surface 12 connected to the at least one output pipe connection 4. A turbulence enhancing inner surface 12 may be implemented e.g. using a corrugated section or a section with a circumferential rippled pattern, or as a section of the output pipe part 11 having protrusions on its inside surface. Such a corrugated pipe section or pattern 12 is also shown in the cross sectional view of FIG. 2. Even if the material in the fluid flow or particle-laden product stream would encounter turbulence when exiting downstream of the output pipe connection 4 or further valve assembly 10, such a corrugated pipe part 12 will prevent the product from caking by establishing a more laminar flow further downstream.

In a further embodiment, the diverter main body 2 may further comprise one or more reinforcement ribs 13 on an outside surface of the diverter main body 2. Such one or more reinforcement ribs 13 provide further structural rigidity to the diverter main body 2 without adding significant weight or cost of material.

In a further aspect, the present invention relates to a method of providing a pneumatic transportation system, for which we refer to FIG. 3 showing a schematic view of a part of a pneumatic transportation system according to an embodiment of the present invention. In the embodiment of FIG. 3 a network of interconnected pipes 15, 16, 17 is depicted, wherein a plurality of diverter assemblies 1, 1a are utilized for interconnecting the pipes.

According to the present invention, the method of providing a pneumatic transportation system comprises connecting at least one diverter assembly 1 according to any one of the embodiments disclosed herein above to an upstream pipe 15 using the input pipe connection 3, and to at least one downstream pipe 16 using the at least one output pipe connection 4, wherein the at least one downstream pipe 16 is positioned in a plane substantially perpendicular to a longitudinal direction of the upstream pipe 15.

In view of the diverter assembly 1 disclosed above, the upstream pipe 15 may be assigned the input flow direction 3a and the output flow direction 4a may be associated with the downstream pipe 16. As such, the input flow direction 3a and output flow direction 4a are orthogonal. As shown, the upstream pipe 15 and the at least one downstream pipe 16 are arranged at an angle α which is set to effectively and substantially 90° degrees, including possible small misalignments, dimensional variations etc. of the upstream pipe 15 and/or the at least one downstream pipe 16.

According to the present invention, multiple diverter assemblies 1 may be used to cater for specific pneumatic transport requirements, wherein it will be clear that a downstream pipe 16 may itself become an upstream pipe 15 for a successive diverter assembly.

In an embodiment, the method may further comprise connecting at least one further downstream pipe 17 to the additional pipe connection 8, which further downstream pipe 17 is then arranged along a longitudinal direction of the upstream pipe 15.

It is noted that the upstream pipe 15 and at least one downstream pipe 16 are all straight pipes interconnected through one or more diverter assemblies 1 according to the present invention. Such straight pipes do not comprise bends or arcuate sections so as to prevent scaling or caking of transported material there through.

To summarize the above and in view of FIG. 3, the diverter assembly 1 of the present invention may be part of a pneumatic transport system, comprising a feed line 15 leading to a diverter assembly 1, the feed line 15 being connected to the input pipe connection 3 of the diverter assembly 1. At least one exit or output pipe 16 is connected to the diverter assembly 1, the exit pipe 16 being connected to an output pipe connection 4. As mentioned earlier, the diverter assembly 1 may comprise a plurality of output pipe connections circumferentially arranged around the diverted assembly 1, i.e. diverter main body 2, wherein the plurality of output pipe connections each have an output flow direction orthogonal to the input flow direction 3a of input flow connection 3. There are embodiments wherein up to five exit pipes 16 may be connected to a diverter assembly 1. In conformity with orthogonality requirements, the angle α between the feed line 15 and the at least one exit pipe 16 is set to around 90°.

Now, the pneumatic transportation system can be further arranged to comprise a downstream feed line 17 connected to an additional pipe connection 8 of the diverter assembly 1, wherein the output pipe connection 8 comprises a valve assembly 9. The downstream feed line 17 is aligned with the feed line 15 and allows further branching of the feed line 15 downstream of the diverter assembly 1 in the transportation system (e.g. the lowest diverter assembly drawn in FIG. 3). The downstream feed line 17 is at an angle of approximately 180° with respect to the feed line 15.

The downstream feed line 17 may in turn be connected to a further diverter assembly 1a, wherein the downstream feed line 17 is connected to the input pipe connection 3 of the further diverter assembly 1a (e.g. upper diverter assembly drawn). The further diverter assembly 1a may in the depicted embodiment also comprise at least one further exit pipe 18 orthogonally arranged with respect to the downstream feed line 17 as well as the feed line 15. Likewise, the at last one further exit pipe 18 is connected to the output pipe connection 4 of the further diverted assembly 1a.

Figure 4:
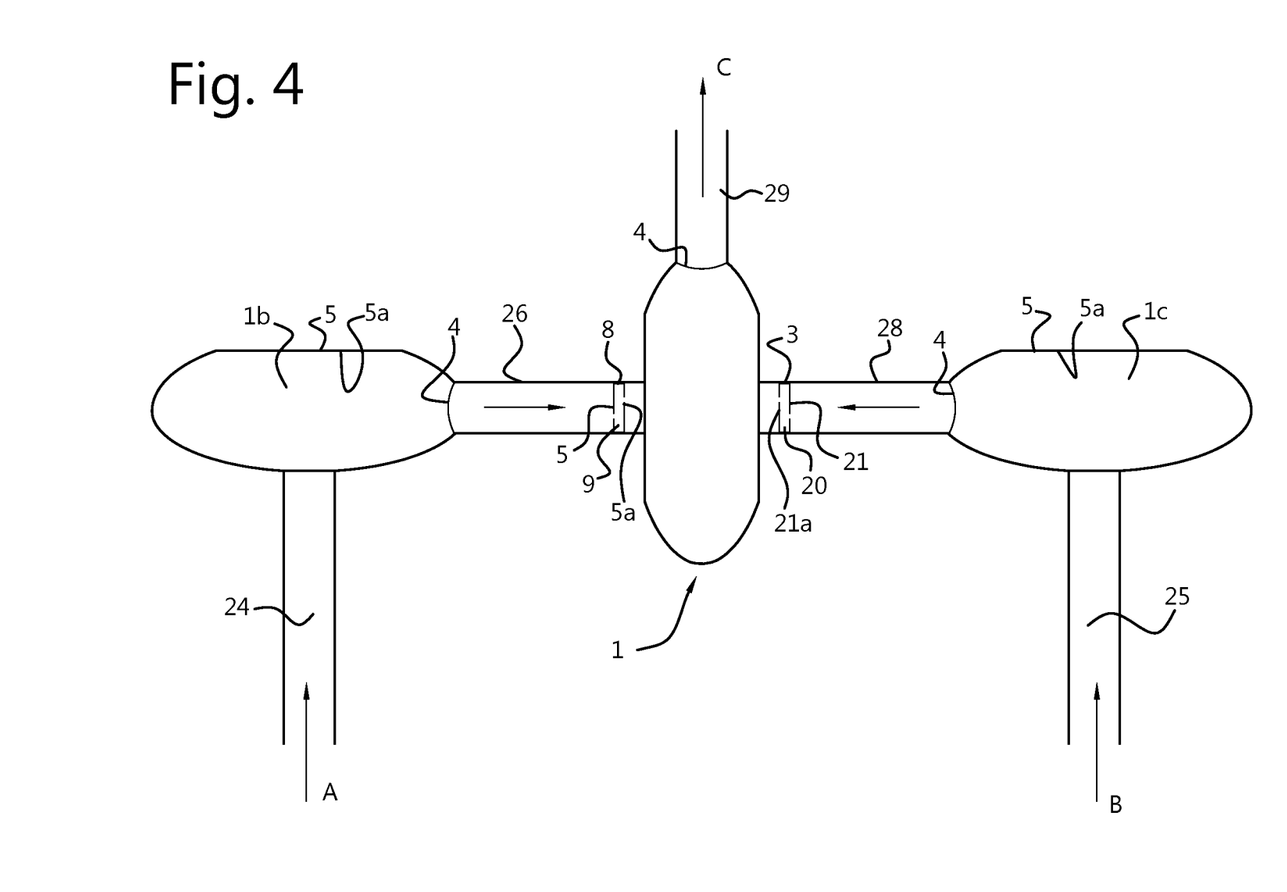
FIG. 4 shows a schematic view of a part of a pneumatic transportation system according to an alternative embodiment of the present invention.

In addition to the embodiment shown in FIG. 3 with regard to a pneumatic transportation system, FIG. 4 shows a schematic pneumatic transportation system according to an alternative embodiment. In particular, the input pipe connection 3 may also comprise an input valve assembly 20 as described above and depicted in, for example, FIG. 2. In view of this this embodiment it is possible to arrange a pneumatic transportation network or system wherein two input material streams A and B may be diverted or deflected to a common output material stream C. More precisely, as shown, the transportation network comprises a primary diverter assembly 1 and two secondary diverter assemblies 1b, 1c according to the present invention. All depicted pipes 24, 25, 26, 28, 29 are straight pipes without bends and/or arcuate sections to prevent caking of transported material. The primary diverter assembly 1 comprises the additional pipe connection 8 with the valve assembly 9 and the input pipe connection 3 is provided with the input valve assembly 20. The output pipe connection 4 is connected to a straight pipe 29 carrying the output material stream C. The valve assembly 9 comprises the collision wall part 5 and collision surface 5a and the input valve assembly 20 comprise the further collision wall part 21 and the further collision surface 21a.

The additional pipe connection 8 is connected to the at least one output pipe connection 4 of one of the two secondary diverter assemblies 1b and the input pipe connection 3 is connected to the at least one output pipe connection 4 of the other of the two secondary diverter assemblies 1c. Each of the two secondary diverter assemblies 1b, 1c comprise a corresponding collision wall part 5 and a corresponding collision surface 5a. As shown, the pneumatic transport system only comprises bends that are substantially perpendicular for preventing caking, scaling etc.

With this exemplary pneumatic transportation system it is possible to choose which input material stream A, B is diverted to the output material stream C. For example, in a first configuration of the pneumatic transportation system, the valve assembly 9 of the additional output connection 8 is in an open position but wherein the further valve assembly 20 of the input pipe connection 3 is in a closed position. In this first configuration the further collision surface 21a of the further valve assembly 20 diverts or deflects the input material stream A toward the output material stream C. In a second configuration it is now possible to divert the input material stream B toward the output stream C by putting the valve assembly 9 of the additional pipe connection 8 in a closed position and to put the further valve assembly 20 of the input pipe connection 3 in an open position. Whichever configuration is chosen, the collision surface 5a and the further collision surface 21a allow deflection of a material stream without causing caking or scaling of transported material streams A, B.

The skilled person will appreciate that in light of the above a modular pneumatic transportation system of mutually parallel and orthogonal pipes can be arranged and interconnected using diverter assemblies as disclosed. The pneumatic transportation system will be free from scaling, caking and/or "plague", thereby increasing uptime, reliability as well as sterility of the pneumatic transportation system and the material transported there through.

As depicted all pipes leading away from diverter assemblies do not comprise any bends or arcuate sections for preventing any possible caking and/or scaling problems. Consequently, during operation, a significant reduction of downtime as well as maintenance cost can be achieved as it is no longer necessary to open up the transportation system and cleaning internals of pipes (wet or mechanically). For example, experience with conventional prior art pneumatic transport systems has shown that within intervals of six weeks, some sections of the transportation system had to be cleaned from e.g. lactose scaling. However, experiments with a pneumatic transportation system comprising the diverter assembly 1 according to the present invention have shown that no such cleaning was needed within a time span of six weeks and that the pneumatic transportation system was fully operable without downtime for much longer periods.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. A diverter assembly which pneumatically transports a substance with bulk material using a fluid flow, comprising
   a diverter main body provided with an input pipe connection having an input flow direction, and at least one output pipe connection having an output flow direction perpendicular to the input flow direction, wherein the diverter main body further comprises
   a collision wall part arranged remote and opposite from the input pipe connection and having a substantially rigid collision surface arranged perpendicular to the input flow direction,
   a narrowing flow part shaped and arranged to provide a flow path from the collision wall part to the at least one output pipe connection,
   wherein the diverter main body further comprises a curved wall part extending between the collision wall part and the input pipe connection, and
   wherein the curved wall part, narrowing flow part and collision wall part form a fluid tight enclosure between the input pipe connection and the at least one output pipe connection.

2. The diverter assembly according to claim 1, wherein the collision wall part has a surface area larger than a cross sectional surface area of the input pipe connection.

3. Diverter assembly according to claim 1, wherein the at least one output pipe connection comprises two, three or four output pipe connections.

4. The diverter assembly according to claim 1, further comprising an additional pipe connection with an additional input or output flow direction substantially aligned with the input flow direction, the additional pipe connection comprising a valve assembly, wherein the valve assembly is arranged to function as the collision wall part of the diverter main body in a closed position.

5. The diverter assembly according to claim 4, wherein the valve assembly is a sliding type of valve assembly or a butterfly type of valve.

6. The diverter assembly according to claim 1, wherein the at least one output connection is provided with a further valve assembly.

7. The diverter assembly according to claim 6, wherein the further valve assembly is a sliding type of valve assembly, or a butterfly type of valve.

8. The diverter assembly according to claim 1, wherein the input pipe connection further comprises an input valve assembly.

9. The diverter assembly according to claim 8, wherein the input valve assembly comprises a further collision wall part of the diverter main body.

10. The diverter assembly according to claim 8, wherein the input valve assembly is a sliding type, gate type or a butterfly type of valve assembly.

11. The diverter assembly according to claim 1, further comprising an output pipe part provided at least partly with a turbulence enhancing inner surface connected to the at least one output pipe connection.

12. The diverter assembly according to claim 1, wherein the diverter main body further comprises one or more reinforcement ribs on an outer surface of the diverter main body.

13. A method of providing a pneumatic transport system comprising
   connecting at least one diverter assembly according to claim 1 to an upstream pipe using the input pipe connection, and to at least one downstream pipe using the at least one output pipe connection, wherein the at least one downstream pipe is positioned in a plane substantially perpendicular or orthogonal to a longitudinal direction of the upstream pipe.

14. The method according to claim 13, further comprising connecting at least one further downstream pipe to the additional pipe connection.

15. The method according to claim 13, wherein the upstream pipe and the at least one downstream pipe are straight pipes.

16. The diverter assembly of claim 1, wherein the curved wall part has smooth curvature extending from the input pipe connection.

* * * * *